United States Patent
Simon et al.

(10) Patent No.: US 11,386,778 B2
(45) Date of Patent: Jul. 12, 2022

(54) ROAD USER DETECTING AND COMMUNICATION DEVICE AND METHOD

(71) Applicant: sibrtech inc., West Bloomfield, MI (US)

(72) Inventors: Anthony Luke Simon, West Bloomfield, MI (US); Joseph Buck, Northville, MI (US); Michael Patrick Simon, Princeton, NJ (US)

(73) Assignee: SIBRTECH INC., West Bloomfield, MI (US)

(*) Notice: Subject to any disclaimer, the term of this patent is extended or adjusted under 35 U.S.C. 154(b) by 658 days.

(21) Appl. No.: 16/414,889

(22) Filed: May 17, 2019

(65) Prior Publication Data
US 2020/0365013 A1    Nov. 19, 2020

(51) Int. Cl.
```
G08G 1/01      (2006.01)
H04W 4/40      (2018.01)
H04W 4/02      (2018.01)
H04W 12/06     (2021.01)
H04W 12/08     (2021.01)
H04W 76/10     (2018.01)
```

(52) U.S. Cl.
CPC .......... *G08G 1/0141* (2013.01); *H04W 4/023* (2013.01); *H04W 4/40* (2018.02); *H04W 12/06* (2013.01); *H04W 12/08* (2013.01); *H04W 76/10* (2018.02)

(58) Field of Classification Search
CPC .. G08G 1/0141; G08G 1/0129; G08G 1/0133; G08G 1/096725; G08G 1/096741; G08G 1/096783; G08G 1/0116; H04W 4/023; H04W 4/40; H04W 12/06; H04W 12/08; H04W 76/10; H04W 4/02; H04W 4/024; H04W 4/38; H04W 4/44; H04W 4/46
See application file for complete search history.

(56) References Cited

U.S. PATENT DOCUMENTS

| | | |
|---|---|---|
| 9,129,519 B2 | 9/2015 | Aoude |
| 10,101,745 B1 | 10/2018 | Sun |
| 10,235,882 B1 | 3/2019 | Aoude |
| RE48,322 E * | 11/2020 | Fairfield .......... H04N 7/18 |
| 2018/0330607 A1 | 11/2018 | Ioli |
| 2019/0026886 A1 | 1/2019 | Ferguson |
| 2019/0035266 A1 | 1/2019 | Reiss |
| 2019/0035268 A1 | 1/2019 | Madigan |
| 2019/0049262 A1 | 2/2019 | Grimm |
| 2019/0049958 A1 | 2/2019 | Liu |
| 2019/0049992 A1 | 2/2019 | Riess |

(Continued)

*Primary Examiner* — Vivek D Koppikar
*Assistant Examiner* — Dominick Mulder

(57) ABSTRACT

A method and device are disclosed that establish secure electronic communication between an infrastructure device and a remote provider of services to an autonomous vehicle. In response to the autonomous vehicle driving within a predetermined distance of the infrastructure device, the remote provider sends authorizing credentials to the infrastructure device and the autonomous vehicle. Using the authorizing credentials, the infrastructure device and the autonomous vehicle establishing a trusted communication. Through the trusted communication, the infrastructure device sends to the autonomous vehicle a data set including coordinate data of at least one road user.

19 Claims, 17 Drawing Sheets

(56) References Cited

U.S. PATENT DOCUMENTS

| | | |
|---|---|---|
| 2019/0052842 A1 | 2/2019 | Du |
| 2019/0053154 A1 | 2/2019 | Song |
| 2019/0066490 A1 | 2/2019 | Skvarce |
| 2019/0066498 A1 | 2/2019 | Baldwin |
| 2019/0088148 A1 | 3/2019 | Jacobus |
| 2020/0193811 A1* | 6/2020 | Zagajac ................. G08G 1/163 |
| 2020/0244671 A1* | 7/2020 | Nagata .................. H04L 63/062 |
| 2020/0336908 A1* | 10/2020 | Kim .................... H04W 12/069 |
| 2021/0182604 A1* | 6/2021 | Anthony .............. G05D 1/0088 |

\* cited by examiner

ADD TWO-WAY COMMUNICATION

ROAD USER DETECTING AND COMMUNICATION DEVICE AND METHOD

This application contains subject matter in common with application entitled Construction Zone Apparatus and Method, filed concurrently with this application, the contents of which are incorporated herein by reference.

BACKGROUND OF THE INVENTION

Advances in technology and transportation have demonstrated systems to automate the driving of passenger and freight transportation vehicles, to communicate various road information to road users, to communicate various information between vehicles (V2V), and to communicate between vehicles and non-vehicle road users, as well as infrastructure (V2X).

SUMMARY OF THE INVENTION

In an example, a method comprises establishing secure electronic communication between an infrastructure device and a remote provider of services to an autonomous vehicle. When the autonomous vehicle drives within a predetermined range of the infrastructure device, the remote provider sends authorizing credentials to the infrastructure device and the autonomous vehicle. Using the authorizing credentials, the infrastructure device and the autonomous vehicle establish a trusted communication. Through the trusted communication, the infrastructure device transmits a data set including coordinate data of at least one road user to the autonomous vehicle.

According to an example, the data set may also include at least one of: a classification of the road user, a location history of the road user, a predicted path of the road user, a velocity of the road user, and a behavioral model of the road user.

According to another example, a method establishes secure electronic communication between an infrastructure device and multiple remote service providers, each one of the multiple remote service providers is associated with one of a plurality of sets of autonomous vehicles. Responsive to an autonomous vehicle from one of the sets of autonomous vehicles driving within a predetermined distance of the infrastructure device, the remote provider associated with the autonomous vehicle sends authorizing credentials to the infrastructure device and the autonomous vehicle. Using the authorizing credentials, the infrastructure device and the autonomous vehicle establish trusted communication. Through the trusted communication, the infrastructure device sends to the autonomous vehicle a data set including coordinate data of at least one road user.

According to an example, the remote provider may send a first security credential to the autonomous vehicle and a second security credential to the infrastructure device upon the autonomous vehicle entering within a predetermined distance of the infrastructure device. Using the second security credential, the infrastructure device transmits the coordinate data of a road user to the autonomous vehicle. Using the first security credential, the autonomous vehicle confirms the authenticity of the transmitted coordinate data.

According to an example, each of the first and second security credentials is associated with an expiration time.

According to an example, the vehicle requests the first security credential from the remote provider upon entering a predetermined geographic area associated with the infrastructure device.

According to an example, the infrastructure device broadcasts an online-status message and the autonomous vehicle receives the broadcast message when within a broadcast range of the infrastructure device. In response to the broadcast message, the autonomous vehicle requests the first security credential. In response to the request for the first security credential the remote provider transmits the first security credential to the autonomous vehicle and the second security credential to the infrastructure device.

According to an example, the infrastructure device includes sensors with an input view of a predefined area of a road receiving sensor data of road users, and an object classifier utilizing that data to determine various attributes of the road users. The attributes include predicted paths of the road users and map segment tags indicative of route-relevance of each sensed road user. The infrastructure device transmits to the autonomous vehicle the coordinate data and the attributes, including the map segment tags.

According to an example, the map segment tags indicate first route relevant data representing a map segment that the road user is currently occupying and a second route relevant data representing a map segment of a predicted path of the road user.

According to an example, the autonomous vehicle receives the transmitted data, including the map segment tags, and includes in its perception model only road users with map segment tags that match a portion of a planned route of the autonomous vehicle.

According to an example, the object classifier determines predicted paths of each road user based upon a classification and a first behavioral model. The infrastructure device monitors the path of each sensed road user and the path's relationship to established road and pedestrian infrastructure features. Deviations to expected road user behavior are recorded and correlated to the object type of the road user. The set of deviations may also be correlated to object location and time. Periodically, the number and type of deviations are evaluated and, in response to the evaluation, the first behavioral model is updated or replaced with a second behavioral model. The updated or second behavioral model is transmitted to the autonomous vehicle with the coordinate data.

According to an example, the autonomous vehicle uses the updated or second behavioral model in determining potential paths of the sensed road user.

According to an example, the infrastructure device is mounted on construction equipment located within a road construction zone with an input view of a predefined area of a road. The infrastructure device's sensors receive sensor data of road users and of the road construction zone. The infrastructure device senses and classifies objects as construction lane markers and determines coordinates of the construction lane markers. Using map data indicative of drivable lane boundaries of the road construction zone, the infrastructure device determines whether the construction lane markers are within the drivable lane boundaries. If so, the infrastructure device sets temporary lane boundaries for the construction zone and transmits those temporary lane boundaries in the data set.

According to an example, device fixedly mounted in proximity to a road segment includes hardware for receiving sensor input data of the road segment. The device includes a processing system responsive to the sensor input for detecting coordinates of and for classifying road users on the road segment. A communication system within the device includes a credential module receiving a credential that authorizes communications with an autonomous vehicle. A data module uses the credential to sign a data set including at least the coordinates of a detected road user. And a transmission module receives the data set from the data module and transmits a secure communication containing the data set to the autonomous vehicle.

DETAILED DESCRIPTION

Figure 1:
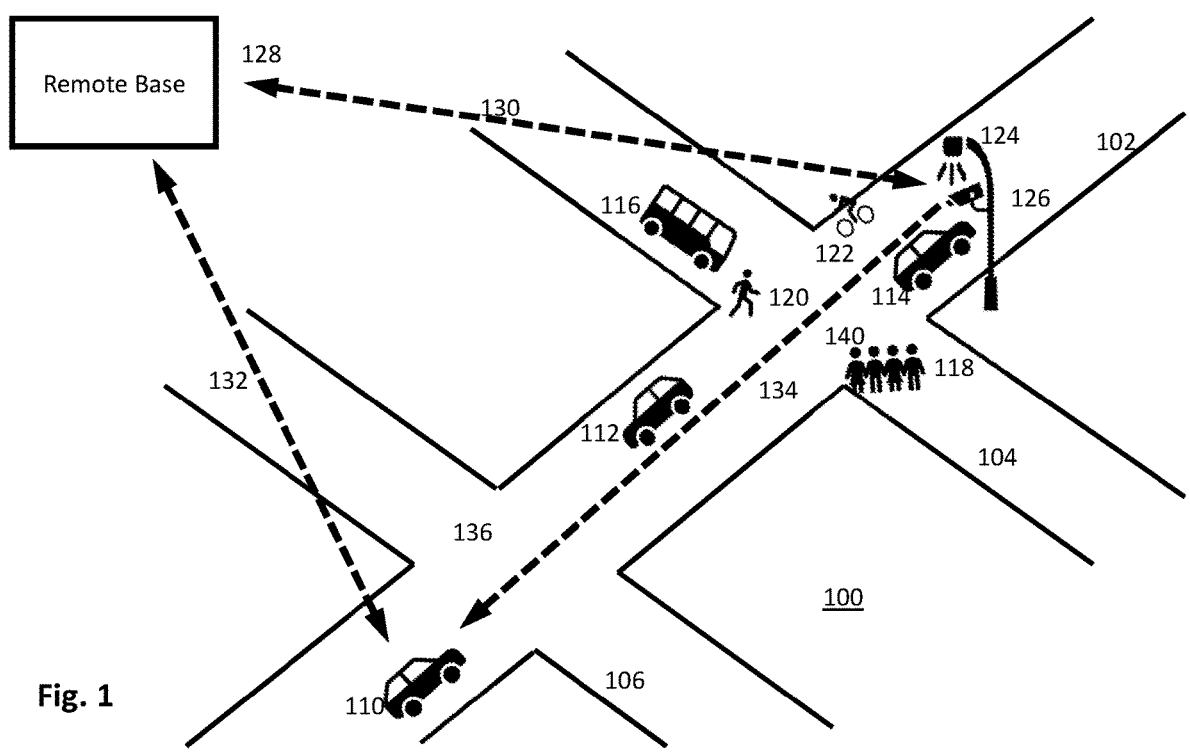
FIG. 1 is a diagram of a road system, road users, and components for implementing an example of this invention.

FIG. 1 is a diagram of a road system 100, showing example road users, including autonomous vehicle 110, vehicles 112 and 114, bus 116, pedestrians 118 and 120, and cyclist 122. An implementation of this invention includes an infrastructure device 126 mounted to a fixture, such as lamp post 124. The infrastructure device 126 includes one or more sensors, which may include one or more of cameras, radar, and LiDAR to detect objects including road users and potential road users in the vicinity of the infrastructure device 126. Using the one or more sensors, the infrastructure device 126 detects the various road users 112, 114, 116, 118, 120, and 122 and the location of each road user. The infrastructure device 126 classifies each road user, and using a combination of historical movement, observable behavior, and behavior models, determines potential paths for each road user.

The infrastructure device 126, autonomous vehicle 110, and remote base 128 send messages to each other through communication links. The infrastructure device 126 and autonomous vehicle 110 both communicate with a remote base 128 through communication links 130 and 132, respectively. Infrastructure device 126 may also communicate through communication link 134 with autonomous vehicle 110 to send information about detected road users 112, 114, 116, 118, 120, and 122 to the autonomous vehicle 110. Through the communication link 134, autonomous vehicle 110 obtains information described above about the road users 112, 114, 116, 118, 120 and 122 beyond what the sensors of the autonomous vehicle may detect from a distance. This information from infrastructure device 126 gives the autonomous vehicle a more complete view of road users in its path.

More particularly, when the autonomous vehicle 110 enters within predetermined range of the infrastructure device 126, a communication link 134 is established between the infrastructure device 126 and the autonomous vehicle 110. In one example, this communication link 134 is one directional from the infrastructure device 126 to the autonomous vehicle 110. In another example the communication link 134 is bidirectional between autonomous vehicle 110 and infrastructure device 126.

For example, the remote base 128 uses autonomous vehicle 110 location updates received periodically through communication link 132 to initiate communication between the infrastructure device 126 and autonomous vehicle 110. When the autonomous vehicle 110 drives within a predetermined range of the infrastructure device 126, the remote base 128 transmits authorizing credentials to the infrastructure device and to the autonomous vehicle 110. Infrastructure device 126 uses the authorizing credentials that it receives to embed authenticating data into a data set of information describing road users 112, 114, 116, 118, 120 and 122. Infrastructure device 126 also encrypts the data set and transmits the data set to autonomous vehicle 110. The autonomous vehicle 110, now within a distance to receive the transmission from infrastructure device 126, uses the authorizing credentials that it receives from remote base 128 to authenticate and decrypt the data set contained within the messages received from infrastructure device 126. This process establishes trusted communication through link 134 between the infrastructure device 126 and the autonomous vehicle 110. Through the trusted communication, the infrastructure device 126 transmits to the autonomous vehicle 110 coordinate data and may also transmit object classification, predicted path information, and other messages described herein.

Figure 2:
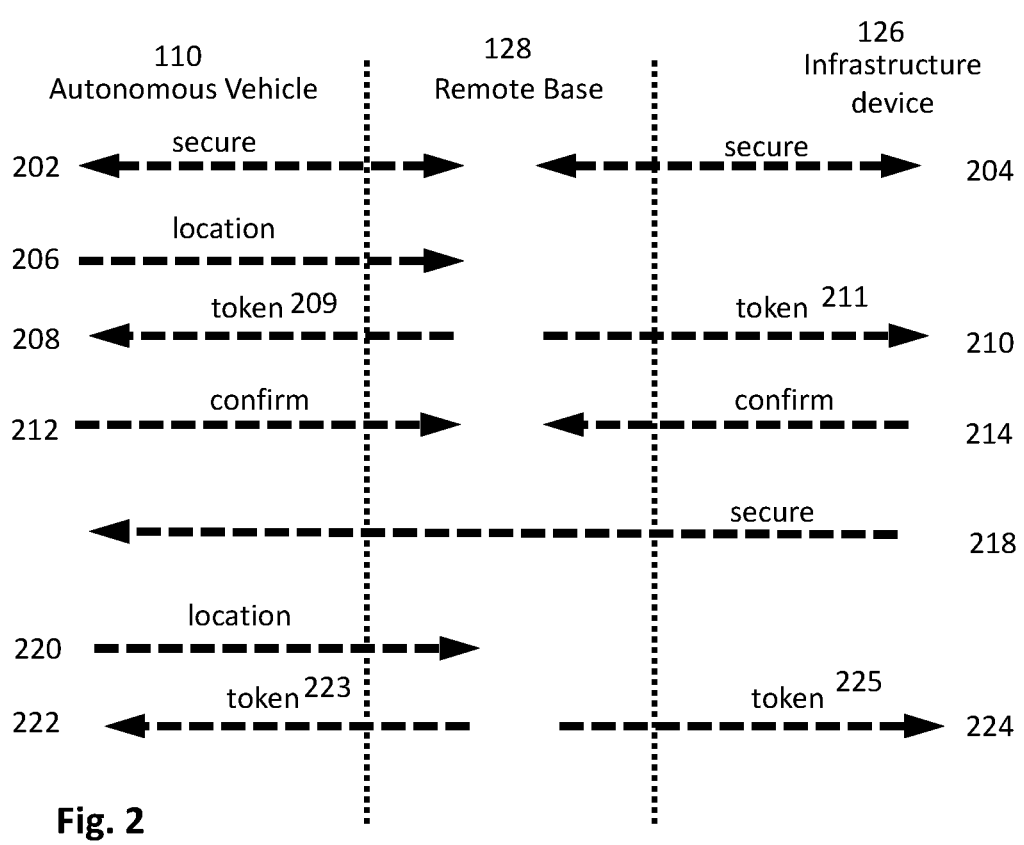
FIG. 2 is an example diagram of communications between a remote provider, an autonomous vehicle, and an infrastructure device.

Referring now also to FIG. 2, an example diagram of communications between a remote base 128 and the infrastructure device 126 and between the remote base 128 and the autonomous vehicle 110 is shown. The communications 202 and 204 (e.g., corresponding to communications links 132 and 130 in FIG. 1) are representative of general secure communications links between the remote base 128 and the autonomous vehicle 110, and the remote base 128 and the infrastructure device 126, respectively. The communications links 202 and 204 may be 4G or 5G wireless links with certificate-based PKI, secured DSRC, or any other suitable wireless communication approach, or combined wireless to land-based network approach, with any suitable security. In addition, it is possible for infrastructure device 126 to be connected directly to a land-based network and communicate with the remote base 128 through the land-based network.

Over the secure link 202, each of the communications 206, 208, 212, 220, and 222 are made. Over the secure link 204, each of the communications 210, 214, and 224 occur.

Communication 206 represents a periodic location update from the vehicle 110 to the remote base 128 that can trigger communication between the infrastructure device 126 and autonomous vehicle 110. The remote base 128 may compare the location communicated from the vehicle to a predetermined boundary around infrastructure device 126. When remote base 128 determines that the autonomous vehicle 110 is within a predetermined range of infrastructure device 126, i.e., when the vehicle enters within the predetermined boundary, the remote base 128 sends through communications 208 and 210 security tokens 209 and 211 to the autonomous vehicle 110 and infrastructure device 126, respectively. Preferably the security tokens 209 and 211 are complementary tokens. The second token 211 is sent to the infrastructure device 126 for encrypting and embedding credentials with the information to be transmitted from infrastructure device 126. The first token 209 is sent to the autonomous vehicle 110 for decrypting the information and confirming the credentials in the transmission that autonomous vehicle 110 receives from infrastructure device 126. Communications 212 and 214 represent confirmation messages that the autonomous vehicle 110 and infrastructure device 126 may send, respectively, to the remote base 128 confirming that each has received its security credentials.

Communication 218 represents a secure transmission from the infrastructure device 126 using the token 211 and received by the autonomous vehicle using the token 209. Over this secure communication 218, the information of road users detected by infrastructure device 126 is transmitted from the infrastructure device 126 to the autonomous vehicle 110 for use by the autonomous vehicle's self-driving computer system.

The remote base 128 may manage token expiration and renewals. The tokens 209 and 211 may have expiration times after which transmissions using token 211 are not recognized as authenticated. The remote base may determine that the vehicle location, represented by location update communication 220, is still within the predetermined boundary of infrastructure device 126 after the tokens 209 and 211 expire. If so, remote base 128 sends new tokens 223 and 225 to the autonomous vehicle 110 and infrastructure device 126 using communications 222 and 224, respectively.

In another example, multiple autonomous vehicles within the predetermined boundary of infrastructure device may receive token 209. In this example, each vehicle receives the same broadcast message from infrastructure device 126. The infrastructure device 126 may initiate the broadcast when any autonomous vehicle is within the predetermined boundary and continue the broadcast message until no autonomous vehicles are within the boundary. If the tokens 211 and 209 expire or revoked, both the infrastructure device 126 and all autonomous vehicles within the predetermined boundary receive updated tokens. In another example, all autonomous vehicles within the predetermined boundary who are associated with one autonomous vehicle management entity receive a first broadcast using tokens 211 and 209, while autonomous vehicles from another management entity receive a second broadcast using a second set of tokens distinct from tokens 211 and 209.

Figure 3A:
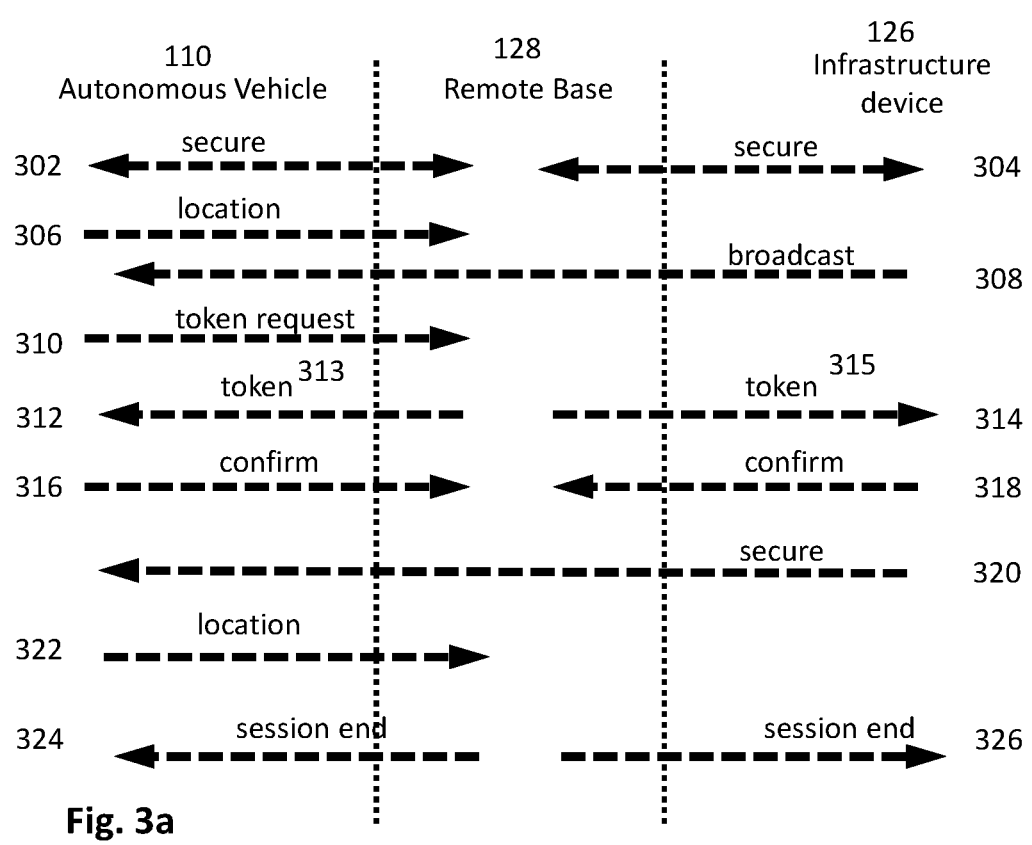
FIGS. 3a and 3b are additional example diagrams of communications between a remote provider, an autonomous vehicle, and an infrastructure device.

Referring now to FIG. 3a, another example diagram of communications between a remote base 128, autonomous vehicle 110, and an infrastructure device 126 is shown. In this example, reference 302 represent the secure communications link over which the communications 306, 310, 312, 316, 322, and 324 take place between the remote base 128 and autonomous vehicle 110. And reference 304 represents the secure communications link over which the communications 314, 318, 320, and 326 take place. Communications 306 and 322 represent location updates from the autonomous vehicle 110 to the remote base 128. Communications 308 represents a broadcast by infrastructure device 126 that the autonomous vehicle 110 receives when within a broadcast range of infrastructure device 126. In response to the broadcast 308, the autonomous vehicle 110 determines that it is within range of infrastructure device 126. Through communication 310, autonomous vehicle 110 informs the remote base 128 that the autonomous vehicle 110 has detected the presence of an infrastructure device 126 and requests a token from the remote base 128. The remote base 128 confirms that an authorized infrastructure device 126 is within range of the autonomous vehicle 110 and, if so, sends tokens 313 and 315 to the autonomous vehicle 110 and infrastructure device 126 respectively through messages 312 and 314. Messages 316 and 318 confirm receipt of the tokens by the autonomous vehicle 110 and infrastructure device 126, respectively. Then message 320 begins the secure transmission of detected road user data from the infrastructure device 126 to the autonomous vehicle 110, similar to the communication 218 described with respect to FIG. 2.

In this example, message 322 may provide to the remote base 128 location information indicative of the autonomous vehicle 110 leaving a predetermined area for which information from infrastructure device 126 is useful for the autonomous vehicle 110. If so, the remote base sends session-end messages 324 and 326 to the autonomous vehicle 110 and infrastructure device 126, respectively. This message triggers immediate expiration of tokens 313 and 315. In addition to the location-based session termination, the credentials 313 and 315 may each have an expiration time, after which transmission using credential 315 are no longer recognized as authenticated by the autonomous vehicle 110.

Figure 3B:
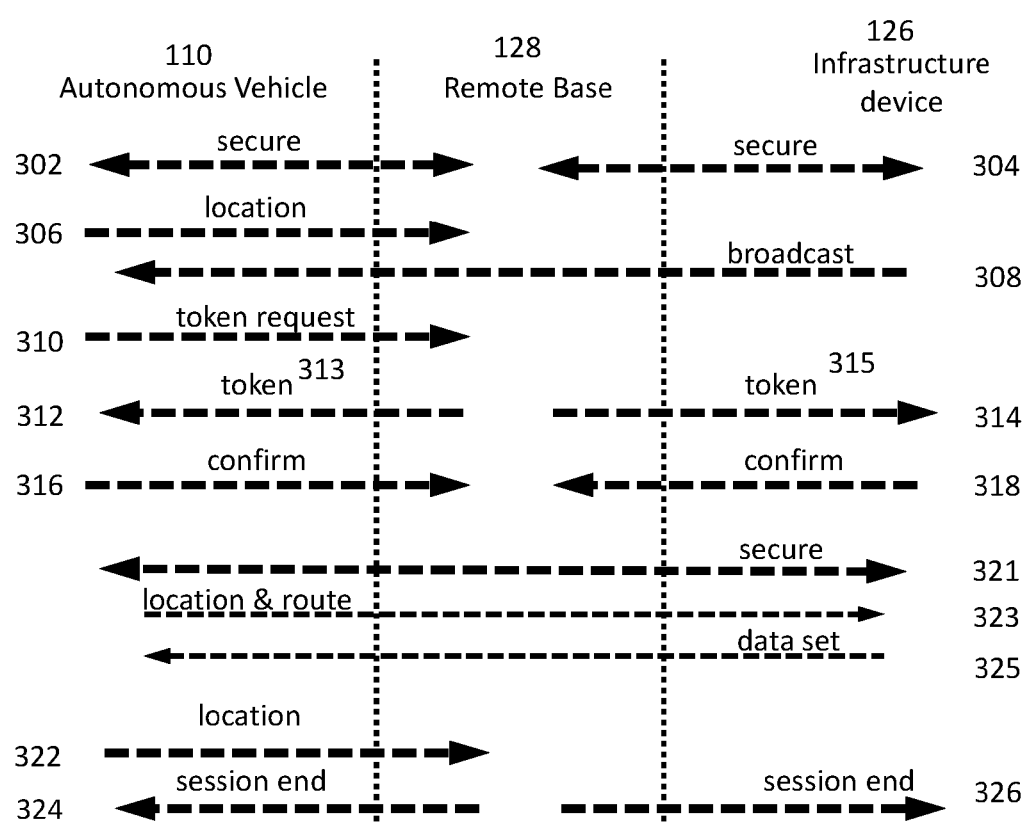

Referring now to FIG. 3b, the example timing diagram shown is similar to the timing diagram in FIG. 3a, except communication 321 between the infrastructure device 126 and the autonomous vehicle 110 is bidirectional. Over this bidirectional communication, the autonomous vehicle 110 may send its location and route to the infrastructure device 126. The infrastructure device 126 uses the received location and route data to create a data set specific to the location and planned route of the autonomous vehicle 110. Thus, for example, sensed road users and objects not relevant to the location and planned route of the autonomous vehicle 110 are not transmitted in the data set to the autonomous vehicle 110.

Figure 4:
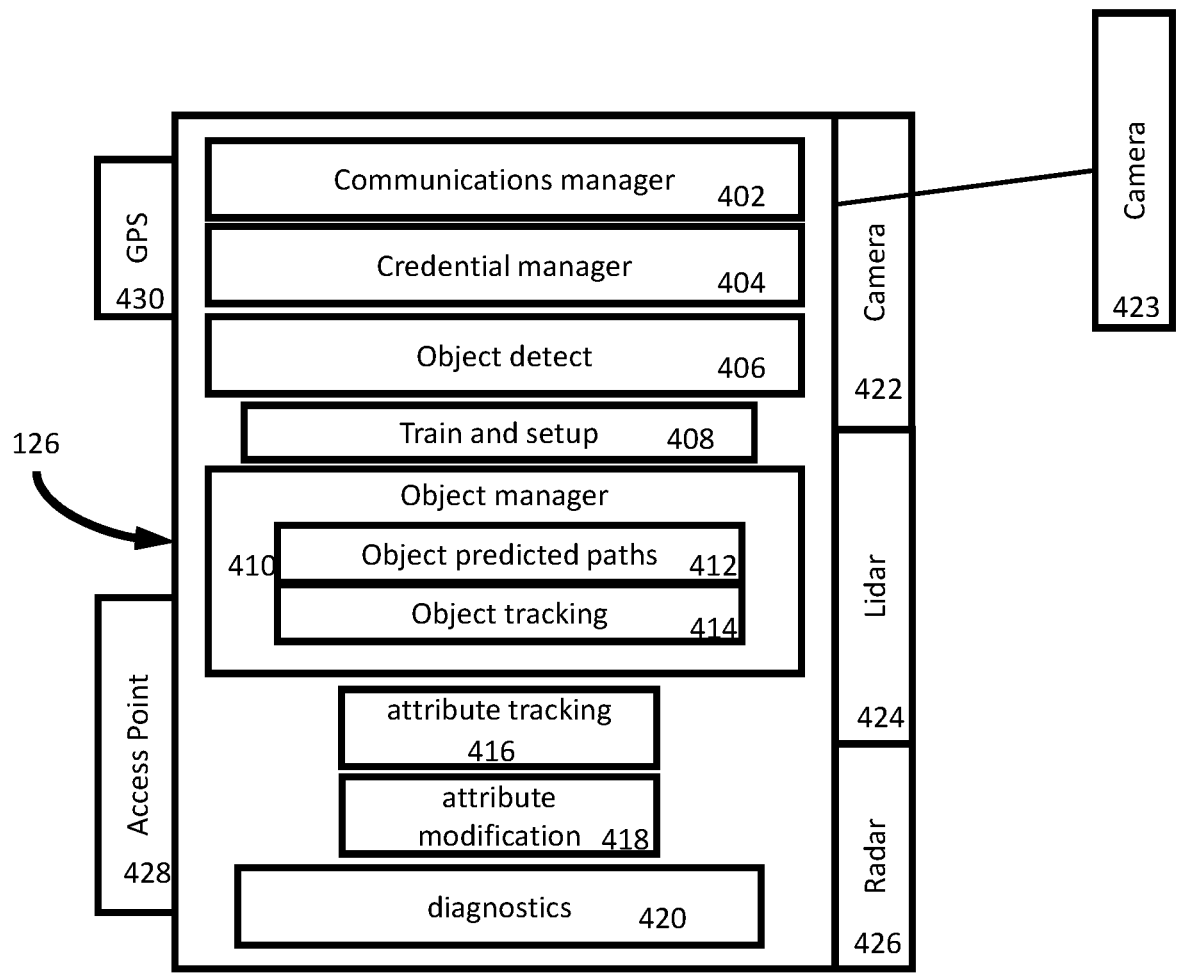
FIG. 4 is a diagram illustrating example functional elements of an infrastructure device.

Referring to FIG. 4, the diagram illustrates example functional elements of an infrastructure device 126. The infrastructure device 126 includes a communications manager 402, a credential manager 404, an object detect module 406, a training and setup module 408, an object manager 410 with predicted paths module 412 and object tracking module 414, attribute tracking and attribute modification modules 416 and 418, and diagnostic module 420. The infrastructure device 126 also includes one or more cameras 422 and 423 as sensor inputs and may also include one or more LiDARs 424 and radars 426 with appropriate interfaces. An access point 428, such as a wireless network access point, or a combined wired and wireless network access point, is also included for communications with one or more remote bases and one or more autonomous vehicles. And GPS 430 may be included as a location input to the infrastructure device 126. In general, the modules 402-420 are software modules operating on a suitable computer hardware known to one skilled in the art using the information provided herein. Communications between infrastructure devices and vehicles as described in various examples herein may be implemented by one skilled in the art, including for example, utilizing equipment made for V2V and V2X communications modified to perform the functions described herein.

The training and setup module 408 may be used when the infrastructure device is first installed at a particular location. During the training and setup, the device "learns" the fixed features of the intersection or road segment from which its sensors receive data. This learning is readily accomplished by one skilled in the art using image processing techniques to detect non-transient portions of the intersection or road segment. An extended learning session may also be used to confirm base model behaviors (discussed further below with reference to FIG. 9) for each class of detected object and road user.

Figure 5:
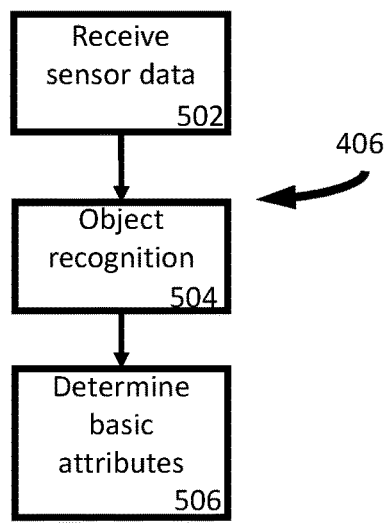
FIG. 5 is a diagram of example steps performed by the infrastructure device of FIG. 4.

Referring now also to FIG. 5, the object detect function 406 receives at 502 the data from sensors 422 and sensors 423, 424 and 426, if included, and processes the data to recognize objects. For example, visual data from camera sensors 422 and 423 may be processed through a software-implemented neural network (or other suitable machine learning or other image recognition model) trained on relevant images types (e.g., vehicles, pedestrians, cyclists, motorcyclists, etc.) for object recognition 504. If the radar 424 and LiDAR 426 are included, the data they produce can be used as inputs (1) directing the image recognition where to detect objects, (2) as inputs to the image recognition software, and (3) as logical inputs to the classification software. Multiple cameras 422 and 423 may be included and spaced apart from one another for better camera coverage of the traffic area of interest.

When an object is recognized, it is given a classification (such as automobile, truck, bus, bicycle, motorcycle, pedestrian, blowing garbage, etc.) and basic attributes at 506. Example attributes may include location coordinates computed from data from one or more of the sensors 422, 423, 424 and 426, combined with the GPS location data and potentially map reference data.

Figure 6:
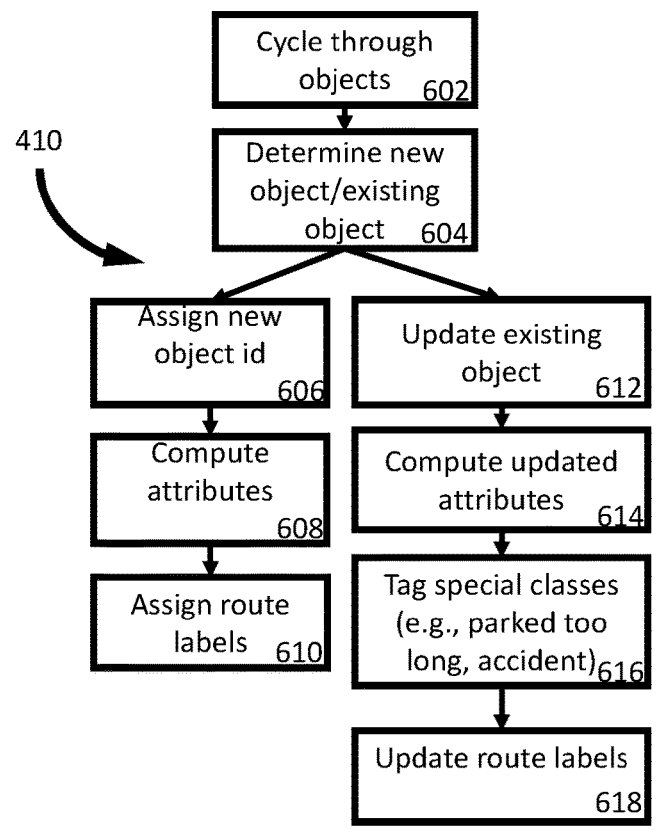
FIG. 6 is a diagram of example steps performed by the infrastructure device of FIG. 4 to manage detected objects.

Referring now also to FIG. 6, the object manager 410 tracks objects and assigns attributes in addition to those assigned by the object detect function 406. At 602 and 604, the object manager cycles through its list of existing objects and compares the objects to new data from the object detect module 406. From this comparison, the object manager determines whether a new object is detected, in which case it is assigned a new identification for tracking purposes (606) or whether an existing object or its attributes need to be updated 612. New objects are given further attributes at 608, such as whether they are on-road, in travel lanes, on an off-road pedestrian area, in an intersection, or in a pedestrian crossing. In addition, attributes may include direction of travel, dimensions, confidence, and predicted path(s).

Based on the attributes, the object is also given route relevance tags at 610. For example, the route relevance tags may designate map segments of first route relevant data indicating a map segment that the road user is currently occupying and a second route relevant data indicating a map segment included in a predicted path of the road user. Referring also to FIG. 1 for example, if autonomous vehicle 110 has a route on which it will turn left at intersection 136, then vehicle 112 and cyclist 122 may be given route relevance tags that would indicate they are potential traffic for intersection 136. But pedestrians 118 and 120 and vehicles 114 and 116 at intersection 120 may not be given tags indicating that they are relevant for intersection 136.

Figure 7:
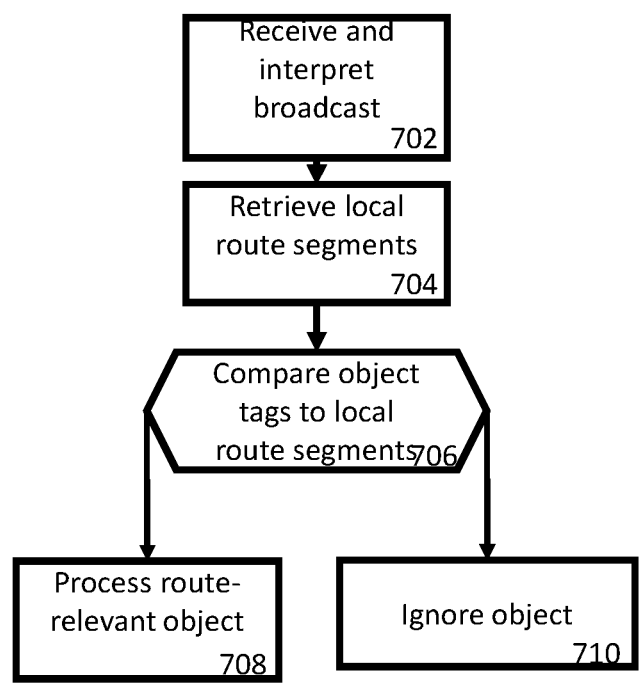
FIG. 7 is a diagram of example steps performed by an autonomous vehicle receiving information from an infrastructure device.

Using the tags, the autonomous vehicle 110 can readily sort road users to identify and use in perception and path planning functions those road users relevant to its planned route. For example, referring now also to FIG. 7, the autonomous vehicle 110 receives the broadcast data from the infrastructure device 126 at step 702. At 704, the autonomous vehicle's computer retrieves local route segments representative of the route the autonomous vehicle 110 is taking and at step 706 compares the route relevant tags of each object to the autonomous vehicle's planned route. The autonomous vehicle can then include the objects with relevant route tags within its processing 708 for perception of relevant road users and ignore other objects 710. This approach conserves the vehicle's processing resources by addressing in the vehicle's computers only to those objects relevant to the vehicle's path.

Referring again to FIG. 6, for an object that is being updated, the object manager computes updated attributes at 614. These updated attributes include updated position history of the object that may enable a more accurate predicted path. In addition, if an object falls within a special class, such as a vehicle that does not move for a predetermined amount of time, an object attribute is added 616, e.g., parked vehicle. At 618, based upon predicted paths for the object, the route relevance tags are updated.

Figure 8:
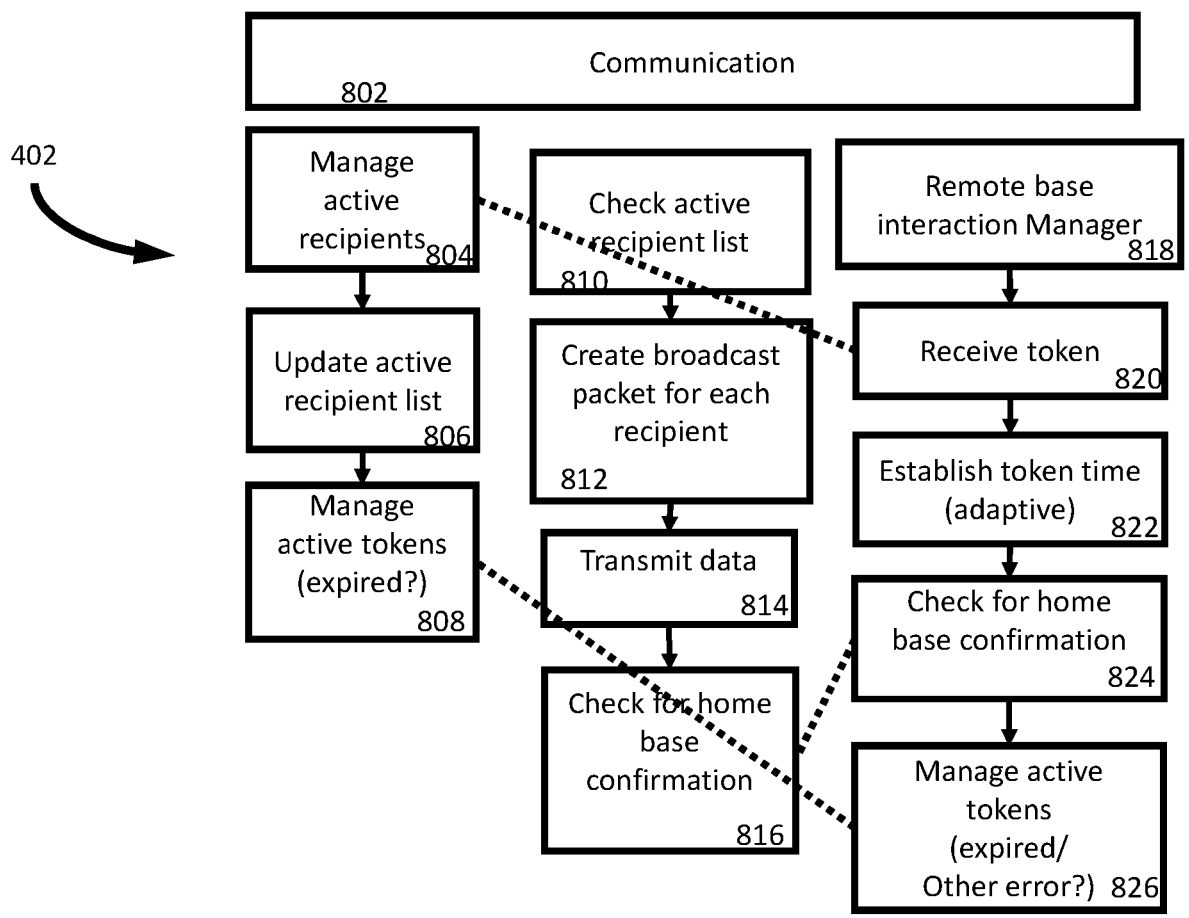
FIG. 8 is a diagram of example steps performed by the infrastructure device of FIG. 4 for communication management.

Referring now also to FIG. 8, the communication manager 402 of infrastructure device 126 includes a communication software component that manages active connections with autonomous vehicles (804, 806 and 808), creates communication packages for each recipient (810, 812, 814, and 816), and manages remote base interactions (818, 820, 822, 824, and 826). To manage the active connections with autonomous vehicles, the infrastructure device 126 does not need to know the specific identification of each autonomous vehicle, it only needs a token for that autonomous vehicle. Additional information about the autonomous vehicle may be provided either by the autonomous vehicle during a two-way communication or by the remote base, but that additional information is not necessary. The active recipient list is updated at 806 for each token received from the remote base at 820 and again at 808 when each token expires or is revoked. The data package for each autonomous vehicle is created at 812 and transmitted at 814 only for those vehicles that have an active token. The vehicle receiving the transmitted data package may confirm receipt either through a bidirectional connection (not shown) with the infrastructure device 126 or through a message to its remote base 128, which relays the confirmation 816 to the infrastructure device 126.

Referring again also to FIG. 1, each token received by the infrastructure device 126 may have an expiration time that may be adaptively set. For example, the infrastructure device 126 may use object tracking data to determine a traverse time representative of an amount of time that a vehicle is likely to be within the vicinity of the intersection 140 monitored by infrastructure device 126. This traverse time may depend upon traffic and/or pedestrian conditions within the intersection 140. The traverse time may also be dependent upon traffic light system settings, such as signal duration settings for traffic light and pedestrian cross-walk signals. The signal duration settings may vary according to preset times or may vary dynamically based upon sensed conditions (e.g., heavy traffic at a particular portion of the intersection). If the token duration is established adaptively at the infrastructure device 126, then the infrastructure device 126 communicates this duration to the remote base 128 so the duration can be communicated to the autonomous vehicle 110. Alternatively, an expiration time or token duration may be communicated with the data package transmitted to the autonomous vehicle 110. The remote base interaction manager 818 also checks for remote base confirmations, if available, indicative that the autonomous vehicle 110 has confirmed receipt of its token and also tracks (826) when a token expiration or revocation signal is received from the remote base, or other error in communication is reported by the remote base.

Figure 9:
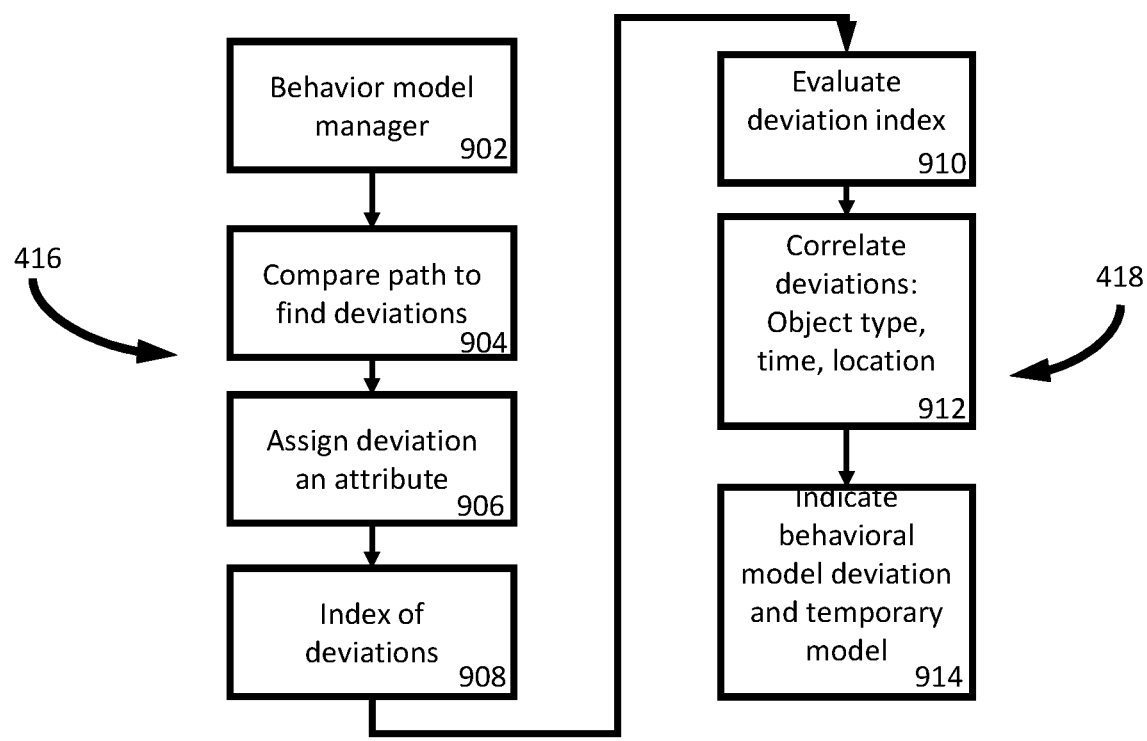
FIG. 9 is a diagram of examples steps performed by the infrastructure device of FIG. 4 to manage behavioral models.

Referring now also to FIG. 9, examples steps that the infrastructure device 126 may perform to manage behavioral models to implement the attribute tracking 416 and attribute modification 418 is shown. The behavioral model manager starts at 902 and at 904 compares the tracked history of each detected object with predictions based upon the current behavioral model. If there is a deviation between the tracked history and the predicted path, the deviation is assigned an attribute at 906. Example deviations may include, but are not limited to, the following:

Pedestrian walked into road away from crosswalk
Pedestrian walked into road near but outside of crosswalk
Pedestrian running
Pedestrian walked into crosswalk against crosswalk signal
Cyclist on wrong side of the street
Vehicle turning from no-turn lane
Vehicle moving but not following traffic lane
Vehicle continuing through yellow or red light The infrastructure device 126 tracks each type of deviation at 908 and 910. This tracking may be accomplished, for example, in an index that keeps count of each type of deviation, its time, its location, and relationship to total number of similar type road users within a predetermined time period. When a deviation hits a total number of occurrences, or frequency, or number in relationship to the total number of similar-type of road users, the behavioral model is updated at 914.

For example, at a specific intersection in a downtown area, a pedestrian near a cross walk may typically be 93% likely to cross within the crosswalk and with the traffic signal. But during high pedestrian traffic periods, such as the beginning and end of a typical work day, 50% of the pedestrians at that specific intersection may cross the intersection near but outside the boundaries of the crosswalk. In addition, a significant number of pedestrians may choose to cross the street at a location outside of and not near the crosswalk. An autonomous vehicle may use knowledge of this behavior detected by the infrastructure device 126 and transmitted as an updated behavioral model in its own path prediction of similar road users. The autonomous vehicle may also use an updated behavioral model received from infrastructure device 126 to plan how it approaches an intersection or road segment and how it drives when pedestrians are near the road both in proximity to and outside of proximity to pedestrian-crossing intersections.

In another example, if a series of pedestrians show history of moving faster than a walking pace, the infrastructure device 126 may detect a group of runners, or perhaps a city race, and temporarily update the pedestrian model accordingly.

An behavioral model may contain the following information: object type, time application, location application, object characteristic 1, object characteristic 2, etc. For example:

Object: pedestrian walking (defines object and state of object the model is applicable to)
Time applicable: until time x (defines time the model is applicable)
Location applicable: location boundaries x1, y1; x2, y2 (defines the geographic are the model is applicable to)
Sidewalk behavior: x % likely to cross street; y % likely to move in same direction
Intersection behavior: x % likely to cross in crosswalk, y % likely to cross outside of crosswalk, z % likely to cross against signal.
Road pedestrian zones: location 1, location 2, location 3

The "object data" defines the object and state of the object for which the model is applicable—here a pedestrian who is walking. The "time applicable" defines a time period for which the model is valid. The "location applicable" defines the geographic boundaries to which the model is applicable. The "sidewalk behavior" and "intersection behavior" define factors that impact path prediction of the road pedestrian. And "road pedestrian zones" defines road areas not marked as pedestrian zones, but that pedestrians use nonetheless. This tells the autonomous vehicle where pedestrians are more likely to step into the road.

Referring again to FIG. 4, the infrastructure device 126 includes internal diagnostics module 420 with software operations known to those skilled in the art to monitor the operation of the various software modules. In addition, the diagnostics module 420 receives signals from each of the hardware components, including GPS 430, access point 428, cameras 422 and 423, LiDAR 424, and radar 426. These devices may have their own internal diagnostics functions and produce diagnostic error codes if not operating properly. If any of the hardware produces a diagnostic error code, the diagnostics module 420 uses preprogrammed fault logic to determine whether the infrastructure device may remain operational, or whether it should cease normal operation until the error is corrected. Diagnostic codes may be reported remotely to an operator or system (not shown) monitoring the device 126. In addition, an operator or system monitoring the device 126 may confirm the device is operational through communication initiated remotely, and track failures in the event the device is not responsive. In addition, if the device 126 is in a state during which it does not perform its typical operations to transmit data sets to vehicles, it (or its operating entity) may send a message to remote base 128 or to approaching autonomous vehicles informing them of its operational status.

Figure 10:
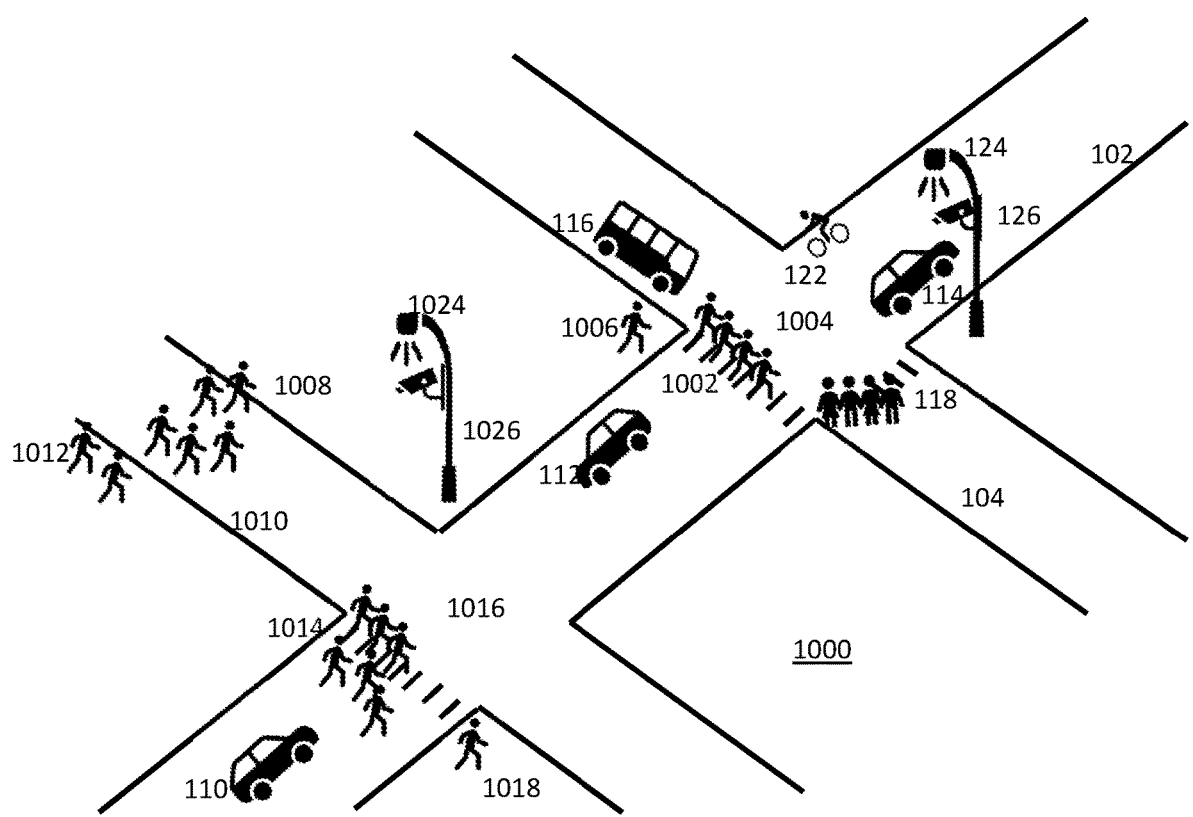
FIG. 10 is an example diagram of a road system illustrating various pedestrian movements.

Referring now also to FIG. 10, the diagram illustrates a road system 1000, road users 110, 112, 114, 116, 118, 122, 1002, 1006, 1008, 1012, 1014 and 1018, and example infrastructure devices 126 and 1026. In this illustration, road users 118 and 1002 are crossing within the crosswalks at intersection 1004. At intersection 1016, a group of pedestrians 1014 are crossing with part of the group inside the crosswalk at part of the group outside, but in proximity to, the crosswalk. Thus, the updated behavior model for pedestrian 1018 will show a greater likelihood that pedestrian 1018 may cross the road outside of the crosswalk. Near road segment 1010, pedestrians 1008 are crossing the street at a location not near a crosswalk. Thus, the updated behavior model for pedestrians 1012, who are not yet on the street, will show greater likelihood that they may, too, enter the street at a location not in or proximate to a crosswalk.

While FIG. 10 illustrates variations with respect to pedestrian behavior, variations for any other type of road user may be detected and used to update behavioral models.

Figure 11:
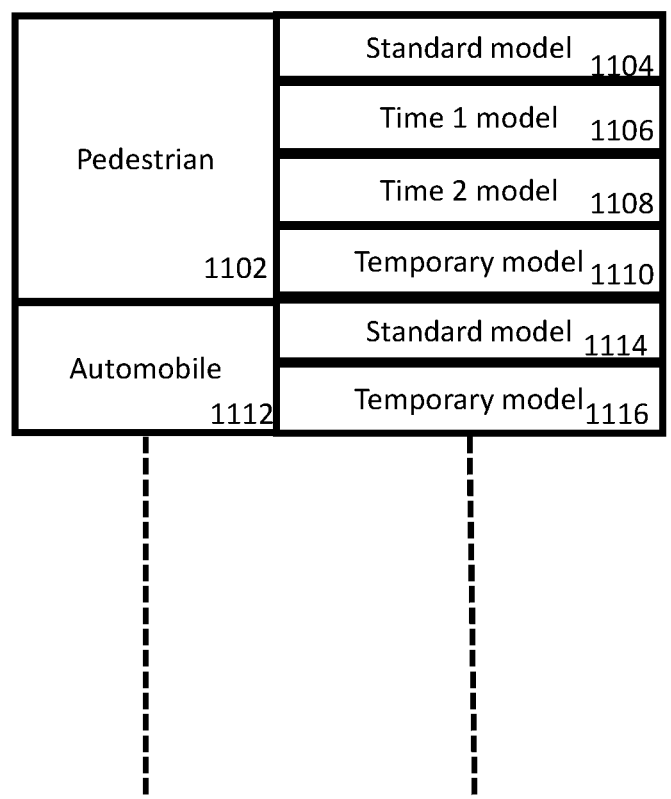
FIG. 11 is an example list of behavior models for example road users.

Referring now also to FIG. 11, an example list of road user behavior models is shown. For purposes of explanation, this example includes pedestrians and automobiles, but it is understood that the behavior models may be applied to any type of road users. In this example, each of the pedestrian 1102 and automobile 1112 object class has a standard model 1104 and 1114, respectively. The pedestrian object class 1102 has a first adapted model 1106 that may recur during morning and evening "rush hours," during which times larger numbers of pedestrians are on the road and pedestrians expand actual road crossings beyond typical pedestrian cross-walk zones. During such times, pedestrians may also stay in the road longer after a traffic light signal changes. A second adapted model 1108 may be representative of typical nighttime pedestrian behavior, during which there is light traffic and many pedestrians may not feel the need to cross a street at cross-walks or with traffic signals. The pedestrian object class 1102 may also have a temporary model deviation 1110 that does not have regular periodic recurrence, but that illustrates pedestrian behavior different from the standard model 1104. This may occur, for example, when a large event such as a show or convention is starting or ending, resulting in large numbers of pedestrians in the vicinity of infrastructure device 126 or infrastructure device 1026 not following typical pedestrian movement patterns.

Similarly, for the automobile object class, there may be times when automobiles do not follow expected predicted paths, in either regularly recurring models (not shown) or behaviors that do not have regular periodic recurrence, such as represented by temporary model 1116.

Figure 12:
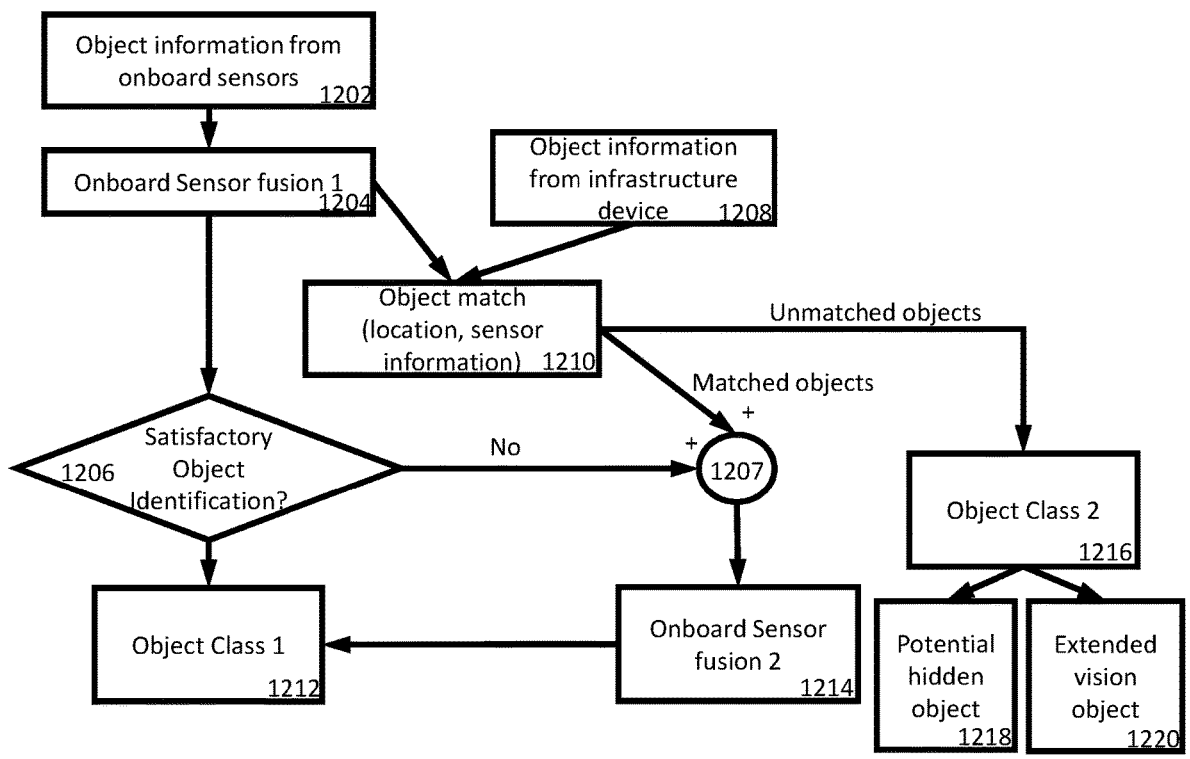
FIG. 12 illustrates example steps performed by an autonomous vehicle receiving communications from an infrastructure device.

Referring now to FIG. 12, example steps performed by an autonomous vehicle receiving communications from an infrastructure device are illustrated. The vehicle receives information from its onboard sensors at 1202. At 1204, the vehicle's computers process the information from the various sensors in a process known in the art as sensor fusion. At 1206, the process checks the results of the sensor fusion 1204 and, where the computer has sufficient information to classify objects, provides those objects as a class of identified objects 1212 for processing as part of the object set detected by the vehicle.

The vehicle also receives object information from an infrastructure device according to this invention at 1208. At 1210, using the data associated with each object transmitted by the infrastructure device, the process matches the objects transmitted from the infrastructure device with objects from the sensor fusion step 1204. The match can be based upon object attributes and position coordinates to determine those objects detected by the infrastructure device and those detected by the vehicle sensors that are (a) likely the same objects (matched objects) and (b) likely different objects (unmatched objects).

Objects that match are reviewed at step 1207 with objects determined by step 1206 to not have sufficient information from vehicle sensors alone for satisfactory classification. Step 1207 performs a second match so that objects matched from step 1210 are matched with the non-classified or insufficiently classified objects from step 1206, and the combined information of those objects—information from the infrastructure device and information from the vehicle's onboard sensors—is provided to step 1214.

At step 1214, for each object matched at 1207, the combined information from the infrastructure device and from the vehicle's onboard sensors (either directly, or as processed by step 1204) is further processed to develop classifications and attribute data for that object. The objects there classified with sufficient confidence are provided to the object class processed at step 1212, effectively adding these objects to the vehicle's "view" of its surroundings for path planning and hazard management.

Objects identified by the infrastructure device that do not match at 1210 with objects sensed by the onboard sensors may be given another class at 1216. These objects may be separated into multiple subcategories for processing by the vehicle's perception, path planning, and hazard management functions. For example, objects within range of the autonomous vehicle's sensors, but not identified by the autonomous vehicle, may be classified as hidden objects as represented by step 1218. Objects beyond the sensor range of the autonomous vehicle's sensors but identified with confidence by the infrastructure device may be considered extended vision objects, known to the autonomous vehicle because of the infrastructure device. Defining the vehicle's vision as the ability of its sensor system to perceive and classify with confidence objects that are road users, potential road users, and potential hazards, the objects classified at 1216, 1218 and 1220 effectively extend the autonomous vehicle's vision. The autonomous vehicle can use these objects for path planning and hazard management, and to direct its sensors and perception system to detect these objects when they become unhidden or within range of the vehicle's sensor system.

Figure 13:
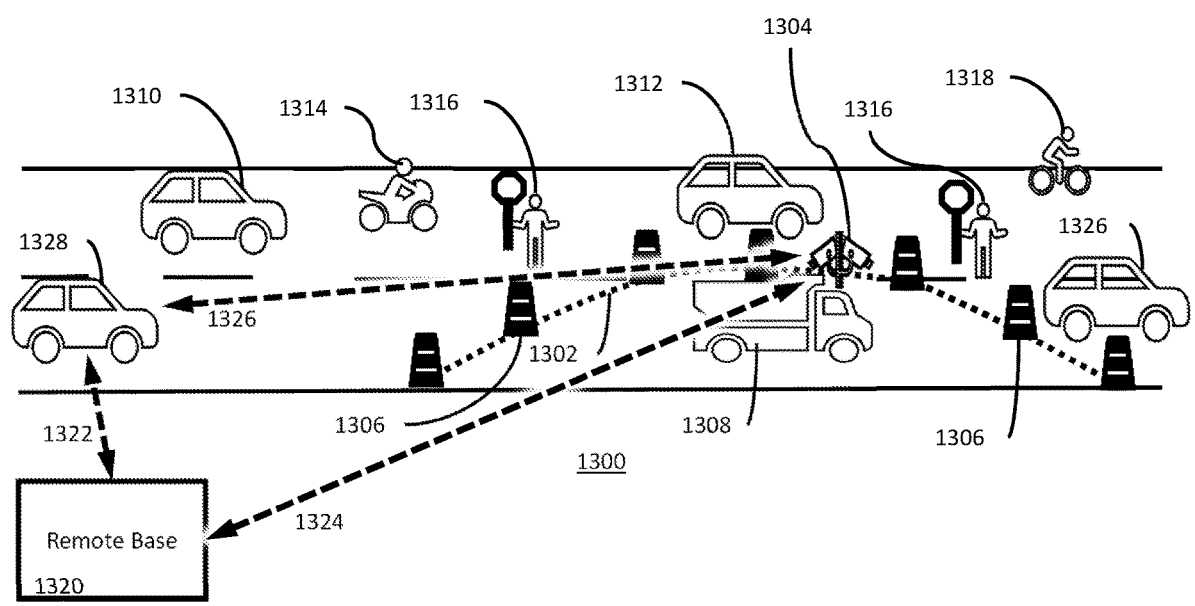
FIG. 13 is a diagram of a road system, road users, and components for implementing an example of this invention.

Referring now to FIG. 13, a diagram of a road system 1300, includes road users 1310, 1312, 1314, 1318, 1328, and 1326, construction equipment 1308, one or more temporary infrastructure device(s) 1304 mounted to construction equipment 1308, construction workers 1316, and road construction markers 1306 (shown here as construction barrels). In this example, a temporary infrastructure device 1304 is shown mounted to the construction equipment 1308, which in this example is a construction vehicle. The temporary infrastructure device 1304 need not be mounted to a vehicle, it can instead be mounted to other construction equipment that is, for example, set in place by construction workers upon arrival to the road construction site.

Upon setup, the temporary infrastructure device 1304 is activated and, using GPS and/or other location matching techniques known in the art, sets its location and sends its location to remote base 1320 through a secure connection 1324. Then, like the above examples, when autonomous vehicle 1328 drives within range of temporary infrastructure device 1304, the remote base sends tokens to the autonomous vehicle 1328 over link 1322 and to temporary infrastructure device 1304 over link 1324. The temporary infrastructure device 1304 has cameras as sensors for sensing the road vicinity around construction equipment 1308. Temporary infrastructure device 1304 may also include other sensors such as LiDAR and radar.

Temporary infrastructure device 1304 may perform all the functions described above with respect to infrastructure device 126 in FIG. 1 and also detect construction markers, such as the construction barrels 1306. Using the location of the construction markers, the temporary infrastructure device 1304 determines a temporary restriction on driving lanes, denoted in the figure by reference 1302. This determination of the temporary restriction on driving lanes may be aided by the observed path of road users such as vehicle 1312 and motorcycle 1314, and by map data containing road segments and drivable boundaries for the road in this system 1300. The new drivable lanes restriction 1302 is included in the data package transmitted to autonomous vehicle 1328 and may also be sent to the remote base 1320. The autonomous vehicle 1328 uses the information on the drivable lanes restriction 1302 in path planning to navigate itself through the construction zone and around equipment 1308.

Figure 14:
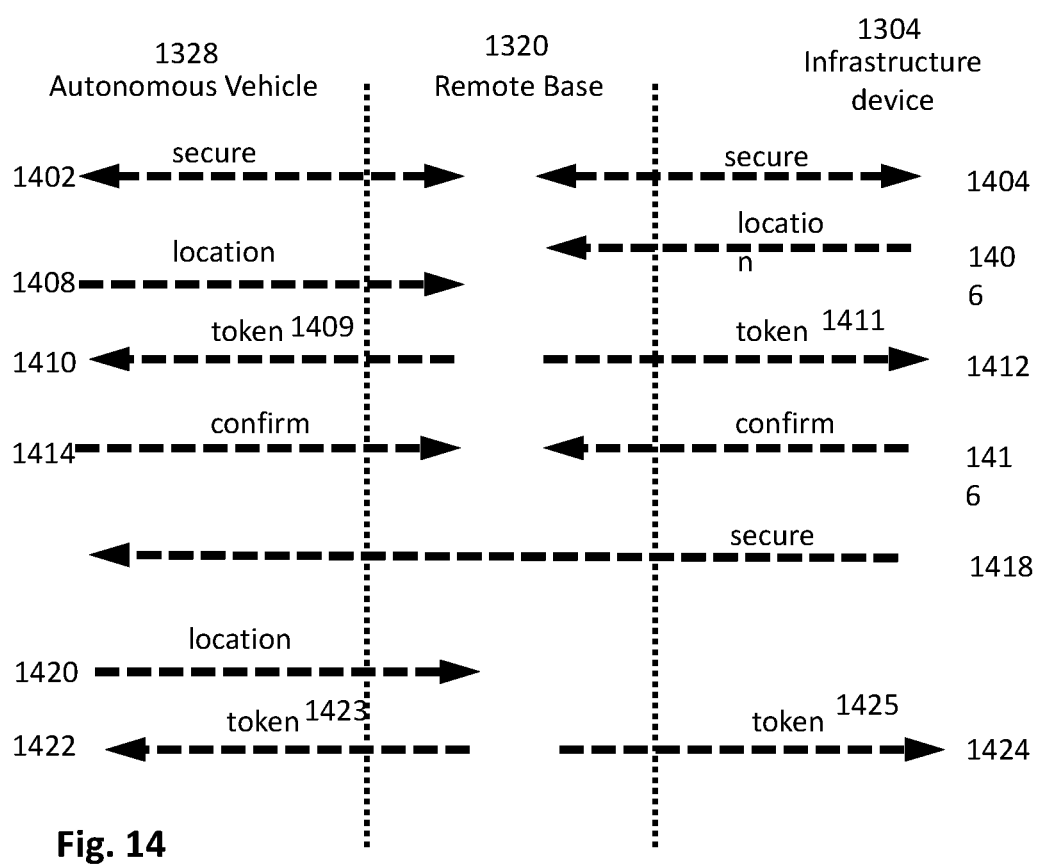
FIG. 14 is an example diagram of communications between a remote provider, autonomous vehicle, and an infrastructure device.

Referring now also to FIG. 14, a diagram of example communications between a remote base 1320, autonomous vehicle 1328 and temporary infrastructure device 1304 is shown. In this diagram, communications 1402, 1404, 1408, 1409, 1410, 1411, 1412, 1414, 1416, 1418, 1420, 1422, 1423, 1424, and 1425 are like the corresponding communications shown in FIG. 2. In addition, this FIG. 14 also illustrates the location message 1406 that the infrastructure device 1304 may send to the remote base 1320 upon activation at a road construction site. The location message 1406 informs the remote base 1320 of the location of temporary infrastructure device 1304 and may include boundary information around the coordinates of temporary infrastructure device 1304. Using this location information, the remote base may determine when the autonomous vehicle 1328 is within a predetermined range or boundary of temporary infrastructure device 1304 for initiation of communications between the temporary infrastructure device 1304 and the autonomous vehicle 1328.

Figure 15:
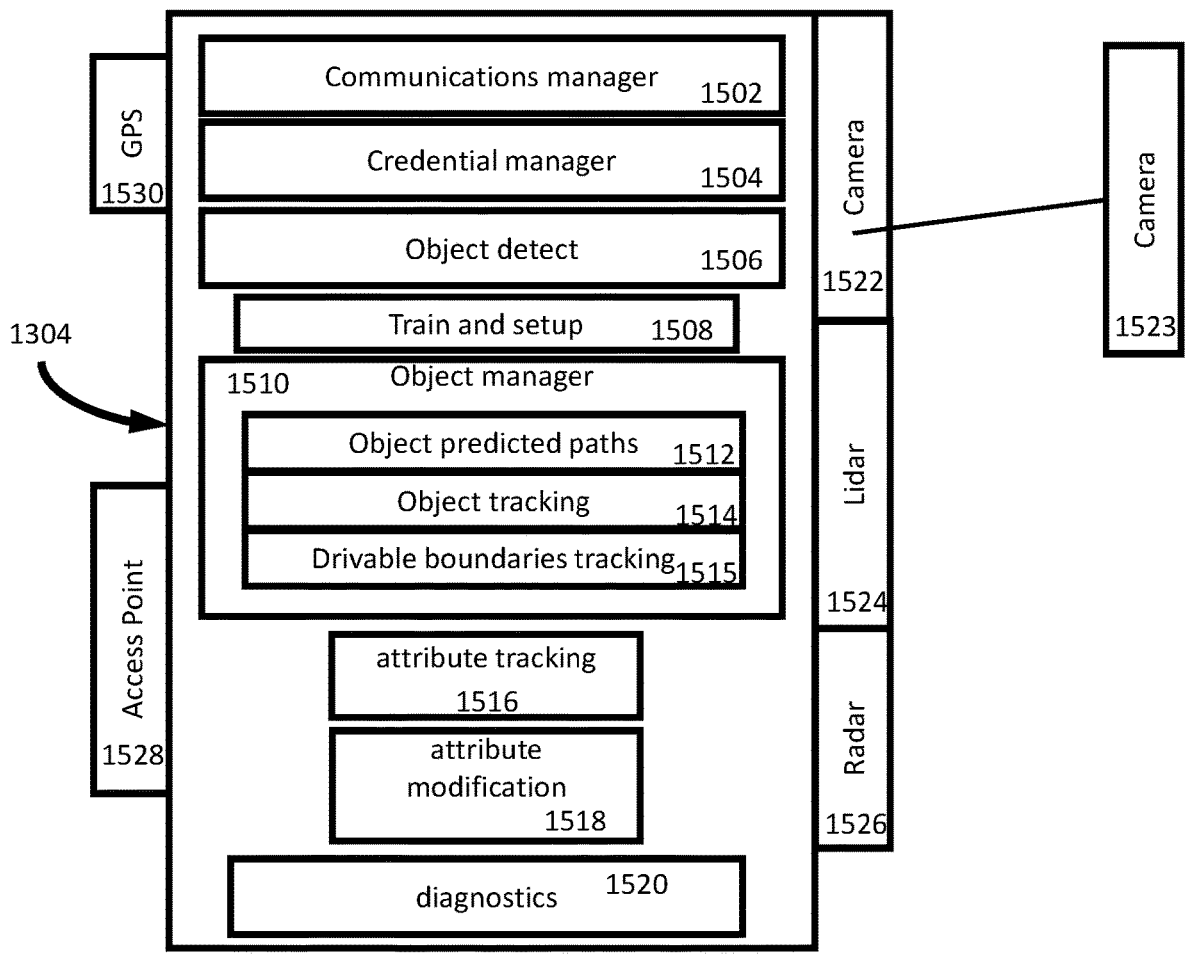
FIG. 15 is a diagram illustrating example functional elements of an infrastructure device for use with a system such as shown in FIG. 13.

Referring now to FIG. 15, this diagram illustrates example functional elements of a temporary infrastructure device 1304 for use with a system such as shown in FIG. 13. The elements 1502, 1504, 1506, 1508, 1510, 1512, 1514, 1516, 1518, 1520, 1522, 1524, 1526, 1528, and 1530 operate similarly to the corresponding elements shown in FIG. 4 with respect to infrastructure device 126. In addition, the temporary infrastructure device 1304 includes within its object manager 1510 a drivable boundaries tracking function, which is better understood with reference to FIG. 16.

Figure 16:
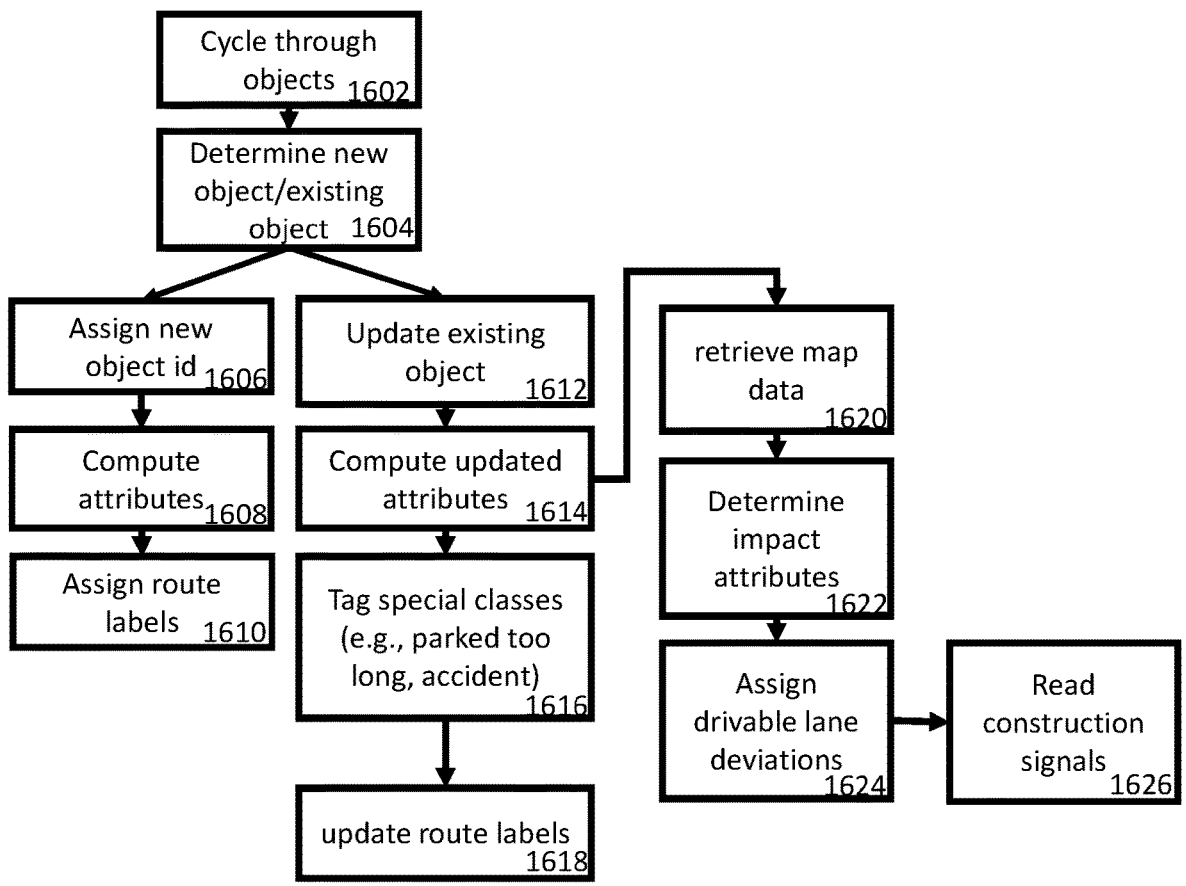
FIG. 16 is a diagram of examples steps performed by the infrastructure device of FIG. 13.

Referring now also to FIG. 16, the diagram illustrates examples steps that may be performed by the infrastructure device of FIG. 13. The processes represented by steps 1602, 1604, 1606, 1608, 1610, 1612, 1614, 1616 and 1618 are like the processes performed by the corresponding steps illustrated in FIG. 6. In addition, once objects are classified as road construction markers, the process moves to step 1620 where it retrieves relevant map segment data, particularly the driving lane boundaries for the construction area. At 1622, the process compares the coordinates of the construction markers to the coordinates defined by the driving lane boundaries and determines whether and to what extent the construction markers are within in the driving lanes as defined by the map data driving lane boundaries. If the construction markers are within the driving lanes, then step 1624 calculates adjusted or temporary driving lane boundaries based upon the position coordinates of the construction markers. The temporary driving lane boundaries may be transmitted with other data to an autonomous vehicle receiving communications from the temporary infrastructure device 1304.

Construction workers 1316 (shown in FIG. 13) are associated with the construction work. In an example, the construction workers 1316 may use standardized signs to direct traffic through the construction zone, or they may use a combination of standardized devices (such as lighted traffic wands of a known type) with standardized hand movements to direct traffic. If so, the temporary infrastructure device 1304 may monitor the positions of the standardized signs or movements of the hand-held traffic wands, determine the intended commands (1626), and incorporate the commands in the data package sent to the autonomous vehicle.

In an example, the autonomous vehicle compares the temporary lane boundaries received from the infrastructure device to the lane boundaries identified in local route segments in the autonomous vehicle's map memory. If the driving lane boundaries are the same (for example, if the autonomous vehicle's internal maps already indicate the construction zone changes), then the vehicle uses its internal data. If the temporary lane boundaries are not the same as the lane boundaries contained in the internal map data of the vehicle, then the vehicle uses the temporary lane boundaries sent from the infrastructure device in its path planning operations.

In an example, the functionality described above for detecting road construction lane boundaries may also be incorporated into the device 126 shown in FIG. 1.

Figure 17:
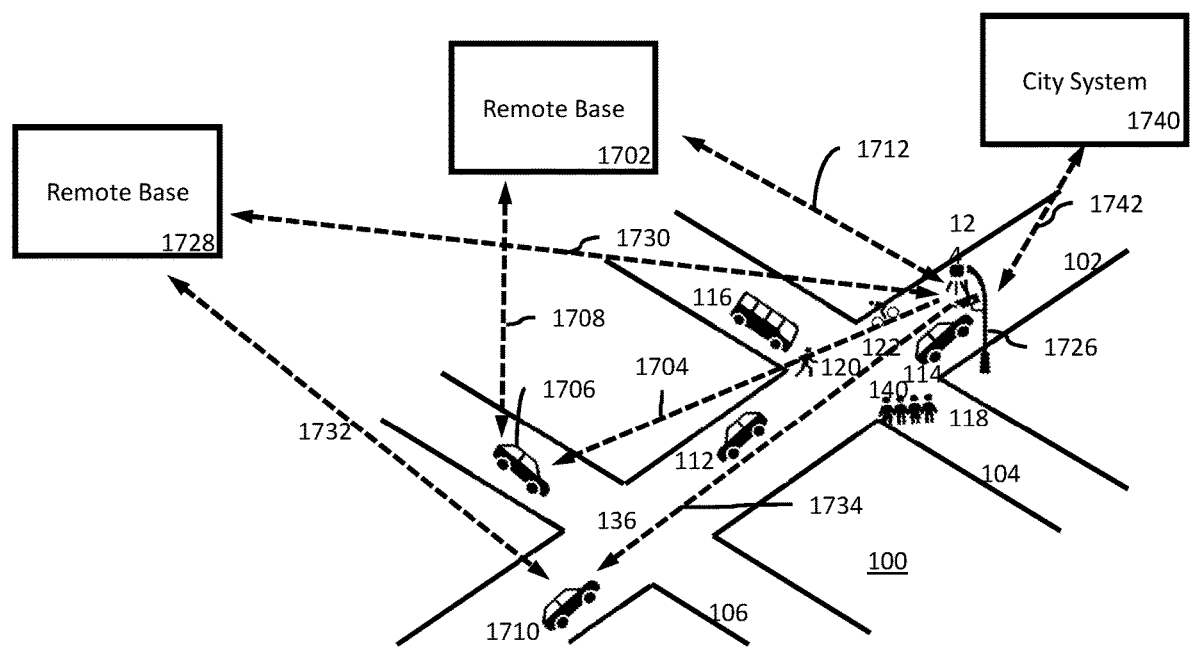
FIG. 17 is a diagram of a road system, road users, and components for implementing an example of this invention with multiple service providers for multiple fleets of autonomous vehicles.

Referring now to FIG. 17, the system shown is similar to that shown in FIG. 1 and also includes two remote bases 1702 and 1728 representing two distinct service providers, each associated with a distinct fleet of autonomous vehicles. Autonomous vehicle 1710 represents a vehicle in a first fleet of vehicles associated with remote base 1728 and autonomous vehicle 1706 represents a vehicle in a second fleet associated with remote base 1702. Communications link 1730 carries messages between infrastructure device 1726 and remote base 1728 and communications link 1712 carries messages between infrastructure device 1726 and remote base 1702. Communications link 1734 carries messages between the infrastructure device 1726 and autonomous vehicle 1710 and communications link 1704 carries messages between infrastructure device 1726 and autonomous vehicle 1706. References 1732 and 1708 represent the respective communications links between autonomous vehicle 1710 and autonomous vehicle 1706 and their respective bases 1728 and 1702.

Each of the remote service providers associated with remote bases 1702 and 1728 may have its own communication requirements, such as protocols or APIs. If so, the infrastructure device 1726 selects the communications requirements associated with the appropriate service provider when establishing communications 1712 and 1732 with the remote bases 1701 and 1728 and when establishing communications 1704 and 1734 with autonomous vehicles 1706 and 1710.

The infrastructure device 1726 may also include a communication link 1742 to a municipal or other government administered system 1740. Through the communication link 1742, the infrastructure device 1726 may communicate relevant traffic data that aids the city planning function. In addition, the municipal system 1740 may send data to infrastructure device 1726 that may be useful to further communicate to autonomous vehicles 1706 and 1710. In another example, the connection to the municipal system 1740 may facilitate a transaction, such as accounting and payment for congestion pricing.

In an example, multiple infrastructure devices may be deployed to detect road users in a single road area or intersection. Prior to transmitting road user data, one device receives the road user information from the other devices in the area, compiles the data together, eliminates redundancies, and then transmits the data representative of road users sensed by the multiple infrastructure devices to one or more autonomous vehicles.

In an example, some of the software functions described above as performed by the infrastructure device may be performed in whole or in part by another computer, server or "cloud" system. In this example, the infrastructure device maintains an operative network connection with the other computer, server, or cloud system.

As can be seen, various examples of the present invention may provide several benefits to advanced transportation systems.

For example, an autonomous vehicle's effective sensing range, or "vision" to see road users and other objects of interest, is limited by the capabilities of its sensors and its processing power. Use of this invention may offer advantages over both of these limitations. By providing advanced information of objects and road users to the autonomous vehicle, the infrastructure device extends the vehicle's knowledge of information relevant to the vehicle's driving route beyond information known only through the vehicle's sensors. Through the communication and data transfer, the infrastructure device becomes another set of sensors serving the autonomous vehicle. Through its ability to process road user information for determining classification, attributes, and predicted paths, the infrastructure device offloads computing demands from the autonomous vehicle. In addition, locating a known object can be accomplished more effectively than scanning for unknown objects. Thus when the autonomous vehicle uses the information from the infrastructure device to locate objects that will come into range of the vehicle's sensors, it saves computational resources compared to the resources needed to scan for those objects as unknown potential objects.

In addition, examples of this invention take advantage of wireless communications to link together autonomous vehicles and infrastructure so they play cooperative roles in driving in areas where their joint capabilities may lead to safer travel. The additional sensing capabilities of the infrastructure device, effectively as an additional set of eyes on the road, when deployed in road segments that are higher in traffic, or statistically shown to have higher risk of accident, may aid public confidence in advanced transportation and mobility technologies, including those used with autonomous vehicles.

The invention claimed is:

1. A method comprising:
    establishing secure electronic communication between an infrastructure device and at least one remote provider of services to at least one autonomous vehicle;
    in response to the at least one autonomous vehicle driving within a predetermined distance of the infrastructure device, sending from the remote provider authorizing credentials to the infrastructure device and the at least one autonomous vehicle;
    using the authorizing credentials, establishing trusted communication between the infrastructure device and the at least one autonomous vehicle;
    through the trusted communication, sending from the infrastructure device to the at least one autonomous vehicle, a data set including coordinate data of at least one road user
    wherein the infrastructure device is mounted to a construction equipment at a location associated with a road construction zone with an input view of a predefined area of a road, wherein the infrastructure device receives sensor data of road users and the road construction zone, and also including the steps of:
    responsive to the sensors classifying objects as construction lane markers and determining coordinates of the construction lane markers;
    using map data indicative of drivable lane boundaries of the road construction zone, determining whether the construction lane markers are within the drivable lane boundaries;
    responsive to the determination of whether the construction land markers are within the drivable lane boundaries, setting temporary lane boundaries for the construction zone; and
    transmitting the temporary lane boundaries in the data set.

2. A method according to claim 1, wherein the data set also includes at least one of: a classification of the at least one user, a location history of the at least one road user, a predicted path of the at least one road user, a velocity of the at least one road user, and a behavioral model of the at least one road user.

3. A method according to claim 1, wherein:
    the authorizing credentials include a first security credential transmitted to the at least one autonomous vehicle and a second security credential transmitted to the infrastructure device; using the second security credential, the infrastructure device authenticates the data set; and using the first security credential, the autonomous vehicle confirms the authentication of the transmitted data set.

4. A method according to claim 3 in which each of the first and second security credentials is associated with an expiration time.

5. A method according to claim 3 in which the vehicle requests the first security credential from the remote provider upon entering a predetermined geographic area associated with the infrastructure device.

6. A method according to claim 1 also including the steps of:
    broadcasting from the infrastructure device an online-status message;
    receiving at the at least one autonomous vehicle the online-status message when the at least one autonomous vehicle is within a broadcast range of the infrastructure device;
    in response to the broadcast message, sending a request from the autonomous vehicle to the remote provider for a first security credential;
    in response to the request for the first security credential, sending from the remote provider the first security credential to the autonomous vehicle and a second security credential to the infrastructure device.

7. A method according to claim 1 wherein the infrastructure device includes sensors with an input view of a predefined area of a road receiving sensor data of road users, and also including the steps of classifying the at least one road user responsive to the sensors; defining a map segment tag indicative of a route relevance of the at least one road user; and
    transmitting the map segment tag in the data set.

8. A method according to claim 7 wherein the at least one autonomous vehicle receives the map segment tag and processes information from the data set corresponding to the at least one road user if the route relevance tag matches a portion of an internal route of the at least one autonomous vehicle.

9. A method according to claim 7, wherein the map segment tag indicates first route relevant data representing a map segment that the at least one road user is currently occupying and a second route relevant data representing a map segment including a predicted path of the at least one road user.

10. A method according to claim 1, also including the steps of:
  determining a first classification of the at least one road user;
  determining a predicted path of the at least one road user responsive to the first classification and a first behavioral model corresponding to the object classification;
  monitoring sensed paths of additional road users having the first classification;
  responsive to at least some of the sensed paths and the first behavioral model, determining a deviation set representative of behaviors deviating from the first behavioral model;
  responsive to the deviation set and the first behavioral model, setting a second behavioral model corresponding to the first classification.

11. A method according to claim 10, also including the steps of:
  determining a predicted path of at least one of the additional road users responsive to the first classification and the second behavioral model.

12. A method according to claim 10, also including the steps of:
  transmitting the second behavioral model in the data set.

13. A method according to claim 10, wherein the monitoring of the sensed paths includes determining a relationship between the sensed paths and at least one of pedestrian infrastructure features and road infrastructure features.

14. A method according to claim 10, wherein the behaviors deviating from the first behavioral model are correlated to location and time.

15. A method according to claim 12, also including the steps of:
  detecting by the at least one autonomous vehicle an autonomous vehicle-sensed road user having the first classification; and
  determining a predicted path of the one autonomous vehicle-sensed road user using the second model.

16. A method according to claim 4, wherein the infrastructure device is associated with a road area, also comprising the steps of:
  detecting at the infrastructure device a vehicle traverse time through the road area; and
  setting an expiration time responsive to the vehicle traverse time.

17. A method according to claim 4 also including the step of sending from the remote base to the infrastructure device a token revocation responsive to the at least one autonomous vehicle driving outside of the predetermined distance from the infrastructure device.

18. A method comprising:
  establishing secure electronic communication between an infrastructure device and multiple remote service providers, each one of the multiple remote service providers providing services associated with one of a plurality of sets of autonomous vehicles;
  responsive to an autonomous vehicle from one of the sets of autonomous vehicles driving within a predetermined distance of the infrastructure device, sending from the remote service provider associated with the autonomous vehicle authorizing credentials to the infrastructure device and the autonomous vehicle;
  using the authorizing credentials, establishing trusted communication between the infrastructure device and the autonomous vehicle;
  through the trusted communication, sending from the infrastructure device to the autonomous vehicle, a data set including coordinate data of at least one road user
  wherein the infrastructure device is mounted to a construction equipment at a location associated with a road construction zone with an input view of a predefined area of a road, wherein the infrastructure device receives sensor data of road users and the road construction zone, and also including the steps of:
  responsive to the sensors classifying objects as construction lane markers and determining coordinates of the construction lane markers;
  using map data indicative of drivable lane boundaries of the road construction zone, determining whether the construction lane markers are within the drivable lane boundaries;
  responsive to the determination of whether the construction land markers are within the drivable lane boundaries, setting temporary lane boundaries for the construction zone; and
  transmitting the temporary lane boundaries in the data set.

19. A device fixedly mounted in proximity to a road segment including:
  hardware for receiving sensor input data of the road segment;
  a processing system responsive to the sensor input for detecting coordinates of and for classifying road users on the road segment; and
  a communication system;
  wherein the processing system includes a computer configured to:
    receive a credential from a remote base authorizing communications with at least one autonomous vehicle within a predetermined distance of the device;
    use the credential to sign a data set including at least the coordinates of a detected road user; and
    transmit a secure communication containing the data set to the at least one autonomous vehicle, and
  wherein the infrastructure device is mounted to a construction equipment at a location associated with a road construction zone with an input view of a predefined area of a road, wherein the infrastructure device receives sensor data of road users and the road construction zone, and wherein the computer is also configured to:
  responsive to the sensors, classify objects as construction lane markers and determine coordinates of the construction lane markers;
  using map data indicative of drivable lane boundaries of the road construction zone, determine whether the construction lane markers are within the drivable lane boundaries;
  responsive to the determination of whether the construction land markers are within the drivable lane boundaries, set temporary lane boundaries for the construction zone; and
  transmit the temporary lane boundaries in the data set.

* * * * *